Patented May 28, 1929.

1,714,956

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

PRODUCTION OF MONOCARBOXYLIC ACID AND ITS DERIVATIVES.

No Drawing.   Application filed June 23, 1928.  Serial No. 287,901.

This invention relates to the production of monocarboxylic acids and their derivatives from polycarboxylic acids and their derivatives, such as anhydrides, esters, nitro and amino derivatives, etc.

In the past monocarboxylic acids have been prepared from some polycarboxylic acids by splitting off of carboxyl groups. Notably benzoic acid has been thus prepared from phthalic anhydride or phthalic acid. The usual method is to heat the phthalic acid or a salt in a water solution but vapor phase catalytic methods have also been used in which vapors of phthalic anhydride admixed with steam are passed over carboxyl splitting contact masses at elevated temperatures. These processes, while usable and practical present certain disadvantages from the point of view of costs and yields.

According to the present process, phthalic anhydrides or their derivatives such as esters or other dicarboxylic acids or their derivatives are passed over catalysts which favor the splitting of carboxy groups in the presence of hydrogen, hydrogen containing or other reducing gases, such as illuminating gas, natural gas, etc., or vapors, such as methyl alcohol, methyl formate, etc. Good yields of the corresponding monocarboxylic acids or their derivatives are obtained and there is practically no loss, for the hydrogen or reducing gases can be recirculated and any unreacted polycarboxylic acid substance can be easily separated from the monocarboxylic acid substance formed and reused. The products obtained will vary with the ratio of hydrogen or other reducing gases, the reaction temperature, time of contact and with the catalyst. Thus it is possible to obtain from phthalic anhydride a high percentage of benzoic acid under suitable conditions and it is an advantage of the process that in some cases the only byproducts are small amounts of benzaldehyde and occasionally benzyl alcohol, which can be readily separated and are themselves valuable substances, so that substantially all of the phthalic anhydride used is transformed into valuable and salable products. Under suitable reaction conditions, and with catalysts which favor reduction, larger proportions of aldehydes and other reduction products are obtained.

Derivatives of polycarboxylic acids, such as esters, may also be subjected to the reaction, thus for example, dimethyl phthalate can be used in the present process, resulting in the production of benzoic acid, methyl benzoate, benzaldehyde, benzyl benzoate, and in some cases small amounts of phthalides, such as monoalkyl phthalides and occasionally anthracene derivatives. Somewhat similar products are obtained when phthalic anhydride vapor admixed with methyl alcohol vapors, with or without hydrogen, is passed over contact masses. Corresponding products may be obtained from other dicarboxylic acids and their derivatives.

Contact masses which may be used in the present invention are very numerous, for not only can contact masses containing the ordinary catalysts favoring the splitting off of carboxy groups be used but many substances which have hitherto been supposed to have little or no catalytic power but which are highly porous, such as certain base exchange bodies, silica gel, etched quartz fragments, filter stones, active carbons, are excellent contact masses and probably owe at least part of their activity to their highly porous physical structure. Other contact masses used are of widely varying types including the actual carboxy splitting components, such as oxides of thorium, other rare earths, beryllium, aluminum, cadmium, zirconium, titanium, alkali and alkaline earths, and the like which may be associated with components which are reduction catalysts, dehydration catalysts, dehydrogenation catalysts, or which by their physical character of high porosity or capillarity act as physical catalysts or activators. The non-carboxy-splitting catalysts, such as reduction catalysts, dehydrogenation catalysts, dehydration catalysts and the like are also important.

Among these groups are included those which favor catalytic reduction or hydrogenations, such as compounds or elements of various metals, such as zinc, copper, silver, gold, iron, cobalt, manganese, thallium, lead, metals of the platinum group, tin, and the like. Many of the catalytic components which are carboxy-splitting catalysts favor dehydration and may, therefore, be considered as composite catalysts. In some contact masses it is desirable to include components which are oxidation catalysts such as those containing metal elements of the 5th and 6th groups of the periodic system, such as vanadium, columbium, tantalum, bismuth, manganese, chromium, molybdenum, tungsten, uranium, etc. Salts of the metal acids are very effective.

Metal alloys can also be used as contact masses. Examples are various alloys of iron, such as ferrochrome, ferrotungsten, ferrotitanium, ferromolybdenum, ferrovanalium, ferromanganese, silico-ferromanganese, aluminum-silico-ferromanganese, copper alloys, such as brass, bronze, aluminum bronze, aluminum alloys such as duralumin and the like, alloys containing beryllium, magnesium and the like.

Many minerals containing effective catalytic elements are also of importance as contact masses; thus for example titanium minerals such as rutile, ilmenite and the like, may be used, copper ore, zirkite, zircon, minerals containing rare earths, etc. The minerals are frequently of very desirable physical structure and many of them form contact masses equal to and in some cases better than artificial contact masses.

The physical catalysts include all porous and capillary substances, such as kieselguhr, pumice, porous rocks of volcanic or eruptive origin, zeolites (natural and artificial), non-silicious base exchange bodies, leached derivatives of base exchange bodies such as glaucosil, and the like.

Other advantageous contact masses are the undiluted and especially the diluted base exchange bodies, such as two-component zeolites, which are the reaction products of at least one silicate with one or more metallates or one or more metal salts the basic radicals of which are metals capable of forming part of the non-exchangeable nucleus of a zeolite; multi-component zeolites, that is to say the reaction products of at least one silicate, at least one metallate and at least one salt, the basic radical of which is capable of entering into the non-exchangeable nucleus of a zeolite; non-silicious base exchange bodies and the like; derivatives of base exchange bodies, such as their reaction products with compounds containing acidic radicals capable of reacting with a base exchange body to form salt like bodies; leached base exchange bodies, etc. Catalytically effective components may be physically associated with the base exchange body or chemically combined therein in exchangeable form, in non-exchangeable form or in the form of acid radicals in salt like bodies.

In fact, the number of contact masses which can be effectively used in the present reaction is extraordinarily large and the present invention is not in any sense limited to any particular contact mass but on the contrary includes all processes of decarboxylating polycarboxylic acids to monocarboxylic acids in the presence of reducing gases with or without steam and with any contact mass.

While the choice of contact masses is enormously large, it should be understood that the reaction conditions are not necessarily the same with all contact masses. Thus, for example, contact masses which contain very strong reduction or hydrogenation catalysts, such as some of those containing iron, cobalt, nickel, or palladium, thallium, lead, silver, copper, zinc, gold, etc., must be run at lower temperatures, such as 340–400° C., than those which contain catalysts having other characteristics. It is an advantage of the present invention that the catalytic process is not critical and in general a fairly wide range of temperatures can be used with the same contact mass although, of course, in all cases there is a certain range of temperature which gives optimum results with any particular contact mass. The reaction may take place at elevated temperatures at atmospheric pressure or at pressures above or below that of the atmosphere. It is usually preferable to carry out the reaction in the vapor phase in a circulatory process, removing the reaction products and any unreacted dicarboxylic acid compounds from the circulating gas stream. It is usually also desirable to remove the carbon monoxide or carbon dioxide formed in the reaction which may be effected by well known methods. When CO is not removed larger proportions of aldehydes are obtained. The hydrogen or reducing gases or vapors may then be reused after suitable additions to make up for losses. The circulatory process is desirable because it permits the use of a suitable excess of hydrogen or other reducing gases without waste and it has been found that an excess of reducing gases is favorable for high reaction speeds and good yields.

In addition to reducing gases themselves, other gases or vapors may be present, such as, inert gases such as nitrogen, gases which speed up or slow down the reaction such as carbon dioxide, steam, and the like.

While for many purposes the catalytic transformation of polycarboxylic acid substances into monocarboxylic acid substances is most effectively carried out in the vapor phase, the invention is in no sense limited thereto and on the contrary liquid phase reactions in which a reducing gas is passed through liquid or dispersed polycarboxylic acid compounds in the presence of contact masses which may be advantageously suspended therein in finely divided form are of importance. Gaseous catalysts, such as iron carbonyl or similar compounds, may be used. Such catalysts, especially when used with sufficient amounts of reducing gases, favor the production of aldehydes, such as for example benzaldehyde from phthalic anhydride. These reactions may take place at atmospheric pressures or at pressures above or below the atmosphere. For best results it is generally desirable to carry out the reaction at temperatures above room temperature in suitable autoclaves.

In the above description special emphasis has been laid on the treatment of phthalic anhydride or acid and its derivatives such as esters. This specific reaction is perhaps the most important commercially at the present time but it should be understood that the present invention is applicable to polycarboxylic acid substances of other types, such as, for example, diphenic acid and its derivatives, adipic acid, maleic acid, succinic acid, tartaric acid, etc.

The invention will be described in greater detail in the following specific examples which set forth a few representative processes, it being understood that the invention is in no sense limited to the specific details therein set forth.

*Example 1.*

200 volumes of quartz fragments, which are retained by a six-mesh screen, are boiled in a 20 N. KOH solution for three hours and then washed with water followed by diluted hydrochloric acid in the proportion of 125 c. c. of concentrated hydrochloric acid per liter of water. The quartz fragments are then heated and agitated and a sodium chloride solution containing 110–120 grams per liter of water is sprayed on to the quartz. The water from the solution is immediately vaporized on coming into contact with the quartz fragments and produces a very uniform coating.

The contact mass is filled into a converter and a mixture of phthalic anhydride vapors and hydrogen in the proportion of 1 kilo of phthalic anhydride per 3–5 cbm. of hydrogen are passed over the contact mass at 360–420° C. Large quantities of benzoic acid are obtained and the reaction product when steam distilled yields a white solid which is volatile with steam and soluble in hot water. After filtering off the product and drying it shows a melting point of 123–124° C. and therefore consists in chemically pure benzoic acid which can be used for medicinal or food preservative purposes.

The reaction product is analyzed by dissolving in boiling water under a reflux, extracting the water solution with chloroform, washing with a little water which is returned to the main water solution, evaporating the chloroform to dryness on a steam bath, dissolving the residue in hot water, and titrating both the water solution of the chloroform soluble material and the water solution which was extracted with chloroform. The titration of water solution which has been treated with chloroform is reported as phthalic acid and the titration of the chloroform extracted material is considered as benzoic acid. Using this method of analysis the product shows from 75–90% conversion of phthalic anhydride to benzoic acid leaving a small residue of unchanged phthalic acid and some water insoluble material in addition to a little benzol.

The sodium chloride can be partly or wholly replaced by compounds of lithium, potassium, rubidium, caesium, magnesium, calcium, strontium, or barium, the chlorides, phosphates and borates of these elements being very effective.

The quartz may also be replaced with other carrier materials, such as pumice, bauxite, alunite, diaspore, unglazed porcelain, natural and artificial zeolites and non-silicious base exchange bodies, especially leached zeolites and non-silicious base exchange bodies, asbestos, various minerals, silicates, metals, metal alloys, silica gel, slag wool, etc. Apparently the carrier acts partly as a catalyst and partly as an activator. The reaction may be carried out with or without the addition of steam.

*Example 2.*

200 volumes of crushed pumice stone retained on a six-mesh screen are coated with 10 parts by weight of zinc oxide in the form of the hydroxide by dissolving 36.5 parts of zinc nitrate with 6 mols of water in 250 volumes of water, precipitating out the hydroxide with concentrated ammonia, filtering, washing and forming a slurry of the cake in 220 volumes of distilled water. The suspension is sprayed onto the pumice, which is heated. The pumice may advantageously be treated with diluted nitric acid before use and dried.

The contact mass is placed in a converter and a mixture of phthalic anhydride and hydrogen in the ratio of 2.95 kilos of phthalic anhydride vapors per 6.75 cbm. of hydrogen is passed over the contact mass at temperatures between 350 and 450° C., preferably between 380 and 400° C. Large quantities of benzoic acid are obtained sometimes contaminated with traces of benzaldehyde and benzol. The yields, determined by method of analysis described in Example 1, are from 78 to 94% of the phthalic anhydride consumed when reaction temperatures are between 380 and 400° C. When higher temperatures are used, small amounts of benzaldehyde separate out from the cooler portions of the condenser and the yields of benzoic acid are between 65 and 75% of the theory because of the formation of some benzol.

By choosing a ratio of phthalic anhydride to hydrogen which gives a very large excess of hydrogen the conversion to benzoic acid proceeds very smoothly with excellent yields.

It has been found that a large excess of hydrogen is favorable for the reaction and a certain improvement is also obtained when hydrogen is mixed with steam. In such cases the benzoic acid obtained is white and nearly chemically pure.

The analysis of the exhaust gases shows a large content of carbon monoxide and sometimes some carbon dioxide. The exhaust gases can be recirculated, preferably after washing out the carbon monoxide in the usual way.

The hydrogen may be replaced with other reducing gases or vapors, such as vapors of methyl alcohol. In such cases benzoic acid of excellent purity is obtained having a melting point of 123–124° C. and a boiling point of 248–250° C. Considerable yields of methyl benzoate having a boiling point of 198–200° C. are also obtained; the main product, however, is benzoic acid. Similar results are obtained when various fuel or illuminating gases are used. The zinc in the contact mass may be partly or wholly replaced by beryllium, cadmium, boron, aluminum, titanium, zirconium, tin, lead, thorium, cerium and other rare earths. The elements may be present as oxides or salts or other compounds with or without carrier materials. Other elements of the periodic system may also be present in the contact masses and many minerals form excellent contact masses. Examples of such minerals are cryolite, spinel, corundum, topaz, witherite, barite, calcite, magnesite, dolomite, vanadinite, apatite, borax, carnallite, feldspar, muscovite, rutile, ilmenite, titanite, zircon, thorite, pyromorphite, and the like.

*Example 3.*

25.75 parts of copper nitrate with 3 mols of water are dissolved in 120 volumes of distilled water, or a corresponding amount of copper nitrate is suspended in water. The copper suspension, or solution, is sprayed onto 200 volumes of pumice fragments, which are heated sufficiently so that the water of the dispersion is rapidly vaporized on striking the pumice fragments. A uniform coating is obtained, and the contact mass is then treated with reducing gases such as hydrogen, water gas, methyl alcohol or methyl formate vapors. The contact mass is filled into a converter, and a mixture of phthalic anhydride vapors and hydrogen, in the ratio of 2.5 kilos of phthalic anhydride per 8 cbm. of hydrogen is passed over the contact mass at 360–400°. The reaction product is fractionally condensed, benzoic acid being the main product in the first condensing chamber while some benzaldehyde is to be found in the tailings. The benzoic acid is purified by steam distillation, which removes impurities such as benzol, and after purification it possesses a melting point of 123–124° C., indicating that the acid is of excellent purity. The boiling point of the sample was 248–250° C., and where esterified with methanol the product shows a boiling point of 199.2° C. and gives a characteristic odor of methyl benzoate. The benzaldehyde obtained was identified by its odor, and possesses a boiling point of 175–180° C. The yield of benzoic acid is between 65 and 75% of theory, and no traces of phthalic anhydride are discernible. Small traces of brown oily materials of indeterminate constitution are obtained as impurities.

If steam is added to the mixture of the phthalic anhydride vapors and hydrogen benzoic acid of high purity is obtained, which can be used directly for the preparation of esters such as methyl, ethyl, butyl, benzyl, amyl or cyclohexyl benzoates. Part or all of the copper in the contact mass may be replaced by iron, cobalt, lead, silver or gold. The elements may be present as such or in the form of oxides or salts.

These contact masses partially decompose the benzoic acid, and small quantities of benzol, benzophenone, diphenyl, anthraquinone, anthracene, 9-phenylfluorene, and appreciable amounts of benzaldehyde are obtained as byproducts. The addition of salts of the alkali and alkaline earth metals considerably improve the action of the contact masses for the production of benzoic acid.

*Example 4.*

12 parts of freshly precipitated $Fe_2O_3$ are suspended in 150 parts of water, and 8 parts of potassium chloride are dissolved in the suspension. The suspension is then coated onto roughened quartz fragments, quartz filter stones, pumice fragments or unglazed porcelain fragments. The contact masses may then be directly used for the transformation of phthalic anhydride to benzoic acid. Thus for example, if a mixture of phthalic anhydride vapors with reducing gases, such as water gas, methanol vapors, illuminating gas, ethylene and the like, in the ratio given in Example 3 is passed over the contact mass at 360–400° C. benzoic acid of high purity is obtained with yields of between 79 and 92% based on the phthalic anhydride consumed. Only minute amounts of benzaldehyde are obtained.

Any other catalytic elements having high activity for reduction or hydrogenation can be used to replace part or all of the iron, thus for example, cobalt, nickel, copper, silver, gold, lead, thallium, zinc, may be used, singly or in admixtures, especially when associated with stabilizing compounds such as the salts of the alkali forming metals. The potassium chloride described above can be substituted partly or wholly by other salts of potassium, or salts of lithium, sodium, rubidium, caesium, magnesium, calcium, strontium or barium, may be used. Suitable salts, in addition to the chlorides, are phosphates, nitrates and some sulphates.

The contact masses may also be modified further by the addition of components containing one or more of the elements aluminum, beryllium, titanium, strontium, zirconium or tin. These components may be considered to enhance or promote the action of the stabilizers in these specific contact masses.

If the loadings mentioned above are exceeded smaller or larger amounts of unreacted phthalic anhydride are obtained in addition to the benzoic acid. The two acids can be easily separated by continuous leaching with benzol, chloroform or other solvents which preferentially dissolve benzoic acid. Another very effective method for separating the two acids, where they are obtained practically anhydrous, consists in esterifying them with the ordinary alcohols such as methyl, ethyl, propyl, isopropyl, butyl, isobutyl, hexyl, benzyl, cyclohexyl and the like. The corresponding esters are obtained, and possess very markedly different boiling points, so that a ready separation by fractional distillation is practicable. Thus for example, methyl benzoate has a boiling point of 199.2° C., whereas dimethyl phthalate has a boiling point of 282° C. The difference in boiling point, 82.8° C., is so great that effective separation by fractional distillation can be effected. The mixture of the esters may also be used directly, for some purposes, such as, for example, as plasticizers for resins and other plastic compositions such as those containing cellulose esters. After separation of the esters they can be saponified and a chemically pure benzoic acid can thus be obtained, while the alcohol can be recovered and reused.

Example 5.

12 parts of freshly precipitated aluminum vanadate are suspended in 120 parts of water and then coated onto comminuted unglazed porcelain, for example by the method described in the foregoing examples. The contact mass is filled into a converter, and phthalic anhydride vapors mixed with reducing gases such as illuminating gas, together with some steam, in the ratio of 3.5 kilos of phthalic anhydride to 8–10 cbm. of reducing gas, are passed over the contact mass under reaction conditions such as those described in the foregoing examples. A technical grade of benzoic acid is obtained and the yield amounts to 80–86% of the theory based on the phthalic anhydride consumed.

Instead of using phthalic anhydride vapors, vapors of the esters of phthalic acid, such as dimethyl phthalate and diethyl phthalate may be used with or without reducing gases such as hydrogen and with or without small amounts of steam. The resulting products are benzoic acid and methyl benzoate or ethyl benzoate, respectively, together with small amounts of benzaldehyde.

The salt used may be partly or wholly replaced by other salts of the metal acids of the 5th and 6th groups of the periodic system, such as columbic, tantalic, bismuthic, chromic, molybdic or tungstic acid. The salts may be present singly or in admixture. The basic radical of the salts may contain one or more of the following elements:— aluminum, beryllium, magnesium, calcium, zinc, strontium, cadmium, barium, copper, silver, titanium, zirconium, tin, lead, iron, cobalt, nickel, manganese. Tin salts of chromic acid are particularly effective. In many cases the contact mass composition may be stabilized by the addition of alkali or alkaline earth metal salts.

Example 6.

A solution of 30–36° Bé. sodium waterglass, diluted with 10–12 volumes of water, in an amount containing 48–50 parts of $SiO_2$ is treated with sufficient 20% ammonia water until the cloudiness which first forms clears up. 29 parts of copper nitrate with 6 mols of water are dissolved in water to form a 10 N. solution, and sufficient strong ammonia water is added until the precipitate which first forms again dissolves up to a deep blue solution. The cuprammonium solution is then poured into the waterglass with vigorous agitation. A 10% aluminum nitrate solution is prepared and gradually added to the mixture of waterglass and cuprammonium nitrate solution until the reaction mixture is just neutral to phenolphthalein. The reaction product is a deep blue gel, which is pressed and dried, and then forms greenish blue fragments with conchoidal fracture.

Instead of using a cuprammonium complex other complex compounds may be used, or metallates such as sodium aluminate, sodium zincate, sodium chromite, or sodium plumbite, may be used, singly or in admixture. The aluminum nitrate may also be replaced partly or wholly by one or more metal salt solutions such as those containing titanium, zirconium, zinc, iron, chromium, vanadium or tungsten.

Contact masses prepared as described above consist of three component zeolites, or, if Solution 2 is not used, of two component zeolites. These zeolites may be used directly as contact masses or they may be subjected to a preliminary treatment with a 5% calcium choride or copper nitrate solution or similar salt solutions containing other elements such as iron, cobalt, nickle, zinc, magnesium, barium or lead. The exchangeable alkali metal bases are replaced by these salts, and the process may be preferably carried out by first hydrating the zeolites with water before commencing base exchange.

The zeolites described above can advantageously be diluted with most various diluents, such as kieselguhr, pumice meal, ground quartz, glaucosil (the acid leached residue of greensand), minerals, etc. The base exchange bodies may also be coated onto artificial or natural carrier bodies, or formed thereon in situ. Examples of such carrier fragments are filter stones, aluminum granules, granules of metal alloys such as ferro-ules, ferrovanadium, ferrochrome, and the like. Alkalies or alkaline earths may be used as cementing agents.

Similar contact masses may be obtained by treating the zeolites, especially after exchanging part of the exchangeable alkali for other elements, with acids such as hydrochloric acid, phosphoric acid, and especially the metal acids of the 5th and 6th groups of the periodic system, in order to form so called salt like bodies with these acids.

Other effective contact masses are obtained by leaching the base exchange bodies produced above with dilute acids, and the amount of leaching may be greatly varied. When the leaching is carried to the limit a very reactive silicic acid is obtained, which is also an effective catalyst for the process.

Phthalic anhydride vapor mixed with hydrogen and steam in the ratio of 1 kilo of phthalic anhydride to 4-6 cbm. of hydrogen and 15-20% by weight of water are passed over any of the contact masses described above at temperatures preferably around 380° C. A product is obtained which consists mainly in benzoic acid, the yield being about 60-90% of the theory based on the amount of phthalic anhydride consumed.

*Example 7.*

Freshly precipitated aluminum hydroxide containing 10 parts of $Al_2O_3$ is dissolved in a 2 N. sodium hydroxide solution to form sodium aluminate with a 10% excess of caustic soda. 6 parts of aluminum sulphate with 18 mols of water are dissolved in 200 parts of water and 17-18 parts of "Celite" brick refuse, or other material such as activated carbon, polysilicates and the like are stirred in. Examples of polysilicates which are well suited are those of calcium, copper, iron, zinc, titanium, zirconium and thorium, both natural and artificial products being usable. The aluminum sulphate is then gradually added to the aluminate solution with vigorous agitation until the mixture remains strongly alkaline to litmus and preferably neutral to phenolphthalein. The reaction product is freed from the mother liquor, dried at temperatures below 100° C. and broken into small fragments.

A modified contact mass may be obtained by hydrating the fragments by means of trickling water over them and then subjecting them to base exchange by trickling 5 to 10% salt solution thereover. By this means one or more bases such as those containing iron, copper, cobalt, silver, lead, manganese or thorium may be introduced. The base exchange bodies obtained may also be impregnated with phosphoric acid or chromic acid in order to form the corresponding salt like body.

Other metallates may replace partly or wholly the aluminate, and many other metal salts may replace the aluminum sulphate, partly or wholly.

The contact mass compositions obtained above may also be leached with dilute organic or inorganic acids such as 1 to 2% hydrochloric acid, enhancing the porosity of the contact masses.

A converter is filled with contact mass prepared as described above and phthalic anhydride vapors mixed with hydrogen and steam in the proportion of 1 kilo of phthalic anhydride to 6-10 cbm. of hydrogen and 30 kilos of steam is passed over the contact mass at 360-390° C. Benzoic acid is obtained with a conversion yield of about 75%.

The above contact mass compositions may also be used for the production of other monocarboxylic acids and their derivatives from other polycarboxylic acid substances. Thus for example naphthalic anyhydride can be split to give good yields of naphthoic acid; diphenic acid may be transformed into phenylbenzoic acid; maleic acid may be transformed into acrylic acid, with the production of some propionic acid. Succinic acid may be transformed into propionic acid, and pyrotartaric acid may be transformed into butyric acid. The reaction conditions are similar to those described above, and it has been found that the presence of steam appears to favor the reaction. These splitting reactions are preferably carried out in converters of aluminum or copper.

*Example 8.*

Instead of using solid catalysts metal carbonyls may be used as gaseous catalysts, thus for example, phthalic anhydride vapors admixed with hydrogen, with or without steam or with other reducing gases as described in the foregoing examples are heated in contact with metal carbonyls such as iron carbonyl or a mixture of iron and nickel carbonyl. The carbonyls may be ready formed or produced in situ. Benzaldehyde or a mixture of benzaldehyde and benzoic acid is ordinarily obtained. As an example of such a reaction, gases containing carbon monoxide, such as water gas, may be passed over iron at a suitable temperature to produce a certain amount of iron carbonyl, then mixed with phthalic anhydride vapors and passed through a hot zone where the temperature is maintained preferably between 360-380° C. Benzoic acid and benzaldehyde are the main products, and yields up to 85% of the theory are obtained.

Instead of using gaseous catalyst powdered catalyst may be used, and may be mixed with phthalic anhydride and sprayed into reducing gases such as hydrogen, with or without steam, or methyl alcohol, the spraying being into a hot zone, preferably about 360° C. Benzoic acid is obtained in good yields, with or without some benzaldehyde, depending on the duration of the heating.

It will be evident that reducing gases which contain serious poisons for hydrogenations and reductions are effectively utilizable for the reactions of the present invention without purification.

*Example 9.*

Polycarboxylic acid substances may be split to monocarboxylic acids in the liquid phase. Thus for example phthalic anhydride is filled into an autoclave, with or without a solvent such as cyclohexane or tetraline, and 3 to 5% of copper carbonate precipitated in kieselguhr is added. The autoclave is preferably lined with aluminum, copper, zinc or alloys of chromium. The mixture is heated in the autoclave to 200-250° C., and hydrogen or hydrogen containing gases are pumped in at a pressure of about 10-20 atmospheres. The heat is maintained for from 3 to 10 hours, and at the end of the reaction most of the phthalic anhydride is converted into benzoic acid with some amounts of benzaldehyde, which vary with the reaction conditions.

Instead of using copper as a catalyst, zinc, aluminum, titanium, zirconium, vanadium, thorium, chromium, manganese or cobalt may be present as catalysts, singly or in admixture.

Instead of using hydrogen containing gases phthalic anhydride mixed with methyl alcohol and the finely divided catalysts mentioned above may be heated in a closed autoclave at 250° C., large amounts of the phthalic anhydride being transformed into benzoic acid and methyl benzoate. Other solvents, such as cyclohexane or tetraline, may be present in addition to the methyl alcohol, and it is sometimes desirable to introduce some hydrogen. The methyl alcohol may be anhydrous or may contain water, it being understood that the present reaction may be carried out in the liquid phase in the presence of water, which of course during the reaction is normally, though not necessarily, present in the gaseous phase.

This application is in part a continuation of my co-pending application Serial No. 226,820 filed October 17, 1927, which matured into Patent No. 1,694,124 dated December 4, 1928.

What is claimed as new is:

1. A method of transforming polycarboxylic acid substances into monocarboxylic acid substances, which comprises causing the polycarboxylic acid substance to react with a reducing gas in the presence of a carboxy splitting contact mass.

2. A method of transforming polycarboxylic acid substances into monocarboxylic acid substances, which comprises passing the vapors of the polycarboxylic acid substance, admixed with a reducing gas, over a carboxy splitting contact mass at an elevated temperature.

3. A method of transforming polycarboxylic acid substances into monocarboxylic acid substances, which comprises passing the vapors of the polycarboxylic acid substance, admixed with a hydrogen containing gas, over a carboxy splitting contact mass at an elevated temperature.

4. A method of transforming polycarboxylic acid substances into monocarboxylic acid substances, which comprises passing the vapors of the polycarboxylic acid substance, admixed with a reducing gas, over a carboxy splitting contact mass at an elevated temperature, in the presence of steam.

5. A method of transforming polycarboxylic acid substances into monocarboxylic acid substances, which comprises passing the vapors of the polycarboxylic acid substance, admixed with a reducing gas, over a catalyst having at least one component which favors reduction, at an elevated temperature.

6. A method of transforming polycarboxylic acid substances into monocarboxylic acid substances, which comprises causing the polycarboxylic acid substance to react with a reducing gas in the presence of a catalyst containing at least one base exchange body or derivative thereof.

7. A method of transforming a phthalic acid substance into a substance containing an oxomethylbenzene nucleus, which comprises bringing about reaction between the phthalic acid substance and a reducing gas in the presence of a carboxy splitting contact mass.

8. A method of transforming a phthalic acid substance into a substance containing an oxomethylbenzene nucleus, which comprises bringing about reaction between the phthalic acid substance and a hydrogen containing gas in the presence of a carboxy splitting contact mass.

9. A method of transforming a phthalic acid substance into a substance containing an oxomethylbenzene nucleus, which comprises bringing about reaction between the phthalic acid substance and a reducing gas over a carboxy splitting contact mass in the presence of steam.

10. A method of transforming a volatile phthalic acid substance into a substance containing an oxomethylbenzene nucleus, which comprises causing the vapors of the phthalic acid substance, admixed with a reducing gas, to pass over a carboxy splitting contact mass at an elevated temperature.

11. A method of transforming a volatile phthalic acid substance into a substance containing an oxomethylbenzene nucleus, which comprises causing the vapors of the phthalic acid substance, admixed with a hydrogen containing gas, to pass over a carboxy splitting contact mass at an elevated temperature.

12. A method of transforming a volatile phthalic acid substance into a substance containing an oxomethylbenzene nucleus, which comprises causing the vapors of the phthalic acid substance, admixed with a reducing gas and steam, to pass over a carboxy splitting contact mass at an elevated temperature.

13. A method of transforming a volatile phthalic acid substance into a substance containing an oxomethylbenzene nucleus, which comprises causing the vapors of the phthalic acid substance, admixed with a reducing gas, to pass at an elevated temperature over a catalyst containing at least one component which favors reduction.

14. A method of producing benzoic acid from phthalic anhydride, which comprises bringing about reaction between phthalic anhydride and a reducing gas in the presence of a carboxy splitting catalyst.

15. A method of producing benzoic acid from phthalic anhydride, which comprises vaporizing the phthalic anhydride, mixing the vapors with a reducing gas and causing them to react at an elevated temperature in the presence of a carboxy splitting catalyst.

16. A method of producing benzoic acid from phthalic anhydride, which comprises vaporizing the phthalic anhydride, mixing the vapors with a hydrogen containing gas and causing them to react at an elevated temperature in the presence of a carboxy splitting catalyst.

17. A method of producing benzoic acid from phthalic anhydride, which comprises vaporizing the phthalic anhydride, mixing the vapors with a reducing gas and steam, and causing them to react at an elevated temperature in the presence of a carboxy splitting catalyst.

18. A method of producing a monocarboxylic acid substance from a polycarboxylic acid substance, which comprises causing the polycarboxylic acid substance to react with a reducing gas in the presence of a carboxy splitting contact mass containing at least one compound of an element falling within the group alkali metals, alkaline earth metals and earth metals whose oxides are not reducible by hydrogen.

19. A method of producing a substance containing an oxomethylbenzene nucleus from a phthalic acid substance, which comprises causing the phthalic acid substance to react with a reducing gas in the presence of a carboxy splitting contact mass containing at least one compound of an element falling within the group alkali metals, alkaline earth metals and earth metals whose oxides are not reducible by hydrogen.

20. A method of producing monocarboxylic acid substances from polycarboxylic acid substances, which comprises bringing about reaction between the polycarboxylic acid substance and a reducing gas in the presence of a metal carbonyl.

Signed at Pittsburgh, Pennsylvania this 14th day of June, 1928.

ALPHONS O. JAEGER.